Oct. 16, 1962   W. C. PLATT ETAL   3,058,887
METHOD FOR RECOVERING CITRUS OIL
Filed Nov. 14, 1958
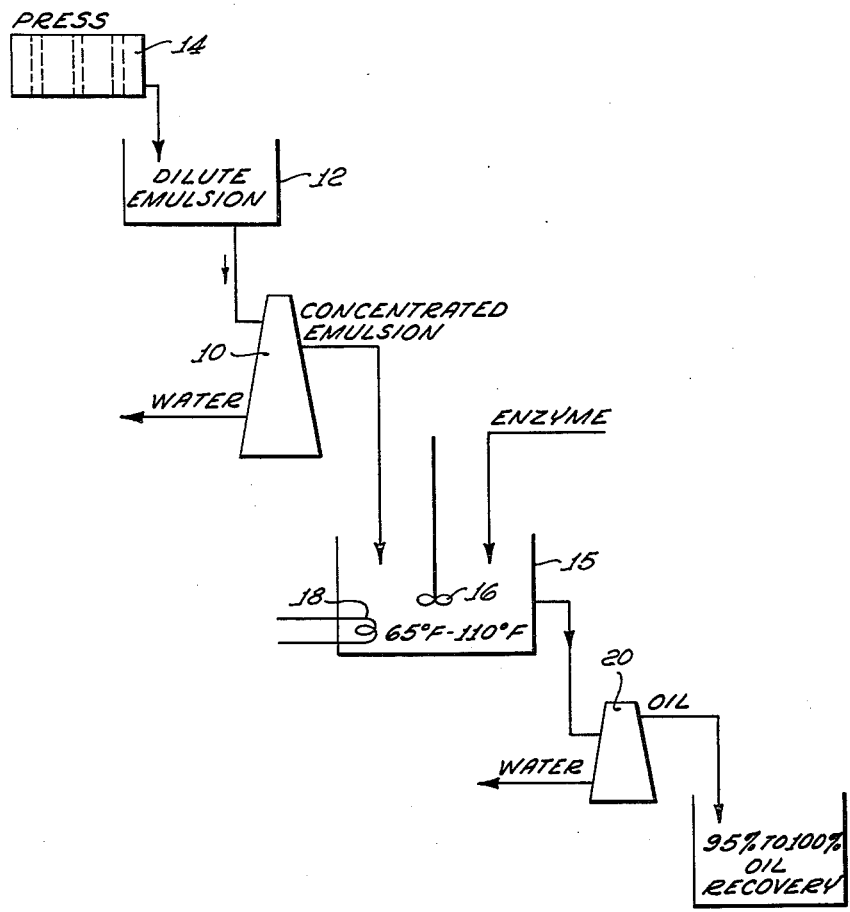
WILLIAM C. PLATT
ARTHUR L. POSTON
    INVENTORS.
BY Paul A. Weilein
      ATTORNEY.

United States Patent Office 3,058,887
Patented Oct. 16, 1962

3,058,887
METHOD FOR RECOVERING CITRUS OIL
William C. Platt and Arthur L. Poston, Ventura, Calif., assignors to Ventura Processors, Ventura, Calif., a corporation of California
Filed Nov. 14, 1958, Ser. No. 773,880
21 Claims. (Cl. 195—3)

This invention relates to the processing of citrus fruits and more especially to the recovery of the flavoring oils from the citrus rind or peel.

In the citrus processing industry, the recovery of the citrus oils, practically all of which are contained in the peel, has been an important commercial operation because of the considerable value of the oils for flavoring and other uses. But the recovery of the oil or "essence," as it is frequently known, is well known to be a difficult operation, and for many years no substantial progress has been made in improving the breaking of the emulsions in which the oils are separated from the fruit, nor in improving the percentage yield of oil. Thus, while lemons and Valencia oranges contain about 12 pounds of oil per ton of fruit and navel oranges contain about six pounds of oil per ton of fruit, however, prior commercial processes have yielded only about five pounds of the 12 pounds of lemon per ton of fruit, only about three pounds of Valencia oil per ton of fruit, and only about one pound out of the six pounds of oil per ton of navel oranges.

It is, therefore, the principal object of this invention to improve the process of treating citrus fruit peel and resultant emulsions so as to increase very materially the percentage recovery of the oil present in the peel. Additionally, it is an object to improve the quality and clarity of the oil product, and also further to improve the economics of the process by decreasing the treatment time, the plant equipment required, and incidentally, the labor time, thereby lowering the overall costs in addition to increasing the yields.

Other objects of the invention and various features thereof will become apparent to those skilled in this art upon reference to the following specification and claims and the accompanying drawing presenting a flow-sheet showing the various operative steps and their relationships.

The oil of the citrus fruit peel may be initially obtained from the peel in any standard or preferred manner, whether it be lemon, Valencia orange, navel orange, tangerine, grapefruit, or any other citrus fruit having the desired oil, essence or essential oil for the required flavoring or scenting use. In a common procedure the citrus juice is initially required, and for this purpose the fruit is sliced and passed to conventional juice extractors from which the peel, still containing the desired essential oil, is discharged as a by-product. Such discharged peel is then passed to any preferred press to expel the oil, such as a screw press, to which relatively large quantities of water are fed during the pressing operation. As a result, a slurry is obtained which contains about 0.3% oil as a stable oil-in-water emulsion or fine refractory suspension. Unfortunately, the emulsified oil in this slurry is only around 70% of the oil in the original peel, the other 30% of the oil being lost in the pressed peel which is sent to waste or for such use as cattle feed or the like. Another less common procedure involves passing the fruit through an abrading machine which removes the outer colored layer or "flavedo" containing the oil. Here again, water, which is used in the grating or abrading process, yields a slurry containing only about 0.3% oil in emulsion form, but from 90% to 98% of the original oil is present in the emulsion.

In each of the above procedures, the 0.3% slurry is passed to a centrifugal machine of the type known as a "sludger" where sufficient water is removed to yield an emulsion containing approximately 65% oil, although sometimes more and sometimes less.

In these prior operations, the next step has been to dilute to 5% oil content with water or about a 20:1 ratio, and again centrifuge. But only about 65% of such oil is recovered as clean oil, which is less than one-half the original oil in the peel with the first process, and not much more in the second process because the separation is too difficult with the more refractory emulsion.

With the present process, the oil is obtained in the 0.3% dilute emulsion slurry as before, and this slurry is passed to the centrifugal sludger to reduce the slurry to approximately a 65% oil emulsion as in prior procedures. Here the similarity ends. Instead of diluting this concentrated 65% emulsion with a large quantity of water, such as a 20:1 ratio, and again centrifuging with a further large loss of oil, the emulsion is diluted only to about a 1:1 ratio and then broken by the particular enzyme treatment of this invention, thereby liberating virtually all the oil of the emulsion which yields an increase in net recovery of about 50% over conventional processes.

Respecting the present enzyme process, we have discovered that by subjection of the 65% or similar high concentration emulsion to the action of certain fungal enzymes under the time, temperature, percentage and acid conditions described below, complete de-emulsification results.

As more fully disclosed below, the indicated enzymes are produced by mold organisms which are cultured in well-known and conventional manners and are recovered from the cultures as commercial enzyme products of the manufacturers. The enzymes used are known as pectases, because of their function of hydrolyzing pectins, and are therefore also known as pectic enzymes. Like all other enzymes, which are also designated by their functions, such as proteases, mannanases and the others, each designated product is a group of undesignated individual enzymes. Since the present de-emulsification does not seem to be pectin hydrolysis, other specifically acting members of the pectase products used may serve as the emulsion breaking enzymes or emulsases here required. In any event, less than 1% by weight of pectase, based on the oil content of the emulsion, is required for the treatment.

PROCEDURE

In practicing this invention in a preferred manner, a quantity of the described concentrated 65% citrus oil emulsion is diluted with water to bring the concentration down to approximately a 1:1 ratio or preferably to 40% oil. This standard 40% concentration is first obtained in all instances because it is desirable to operate by a standard procedure, and because the centrifuged emulsions may sometimes run as low as 45% oil and sometimes as high as 75% oil. A typical emulsion, however, contains 65% oil, as above indicated, which is diluted with water to 40% oil. Such 40% emulsion is then treated by commingling therewith about 0.20% by weight of the oil content of a mold-derived pectic enzyme having the characteristic of breaking the emulsion, as more fully disclosed hereinafter. The pH value of this enzyme-containing emulsion is then adjusted to the optimum value for the enzyme. Ordinarily, such pH value is pH 3.2. Commonly the emulsion pH is 3.2 or very close thereto, but if the pH value is appreciably higher it is adjusted to pH 3.2 by adition of a suitable agent which preferably is citric acid, or if the pH value is too low sodium citrate is added to raise the pH value.

If the particular enzyme batch being used has higher enzymatic activity, the percentage used will be correspondingly reduced, or if it has lower activity, the percentage will be correspondingly increased, in order to obtain maximum results. The percentage variation is easily determined because the manufacturer grades each batch against a unit factor which is its pectin hydrolyzing factor.

It is to be understood that enzyme concentrations and pH values stated are not critical, as will be more fully explained, but they do make for optimum conditions and maximum yields.

Having adjusted the oil emulsion as to oil content, enzyme content and pH, such batch is heated up to an optimum temperature of about 90° F. with slow agitation, and such temperature is maintained, while continuing slow but thorough agitation, for a time to completely break the emulsion and fully liberate the emulsified oil. This condition is easily recognized by an operator with only limited experience, such as after having run only a few batches. The time may vary according to the refractory character of the emulsion, or slight variations in temperature or pH or enzyme activity or agitation, but it will ordinarily lie between about six or eight hours and about twenty hours.

The emulsion having been broken so as to completely release the oil, the resultant liquid batch is then passed to polishing centrifuges, and the oil separated from the aqueous phase and recovered. The recovery is never less than 95% and commonly is close to 100% of the oil content of the emulsion treated. In addition to the higher recovery than in the old conventional processes, the operating efficiency of the centrifuges is greatly increased. For example, where a centrifuge was formerly required to be operated twenty-four hours per day, seven days a week, the same job is now done operating eight hours per day, five days per week.

As indicated above, where optimum conditions, minimum cost, maximum results and maximum oil recovery are not demanded, percentages and other conditions may be varied. For example, reduction of temperature below 90° F. correspondingly increases emulsion-breaking time. Thus, if, after preparing a batch of emulsion at a room temperature of about 70° F., the temperature is maintained at 70° F. for the rest of the run, the breaking time would be extended to about 40 hours or 50 hours, and thereby become economically objectionable, although possible. However, the temperature may be increased to 100° F. with good results, although the time is not greatly decreased. On the other hand, if the emulsion-breaking temperature much exceeds 100° F., objectionable side reactions may occur, although sometimes it is possible to operate up to about 105° F. successfully. Thus, a permissible range may be between about 65° F. to 70° F. and about 105° F. to 110° F., but a desirable range is between about 80° F. and 100° F. Similarly, the enzyme percentage may be increased with perhaps slight advantage up to any amount less than 1%, such as 0.22% or 0.25% or 0.5% where the optimum is 0.20%. But there is not much improvement above the optimum of 0.20%, and there is so little improvement above 0.22% (where the optimum for the particular enzyme is 0.20%) whether in recovery or time reduction or fuel saving, that the increased cost for the enzyme is not justified. Similarly, where the optimum is 0.20%, there may be a reduction to 0.18% or even 0.15%, but the loss in time and often in recovery renders such low percentage not particularly feasible. In no case would the percentage ever be apt to run below 0.10%. As to the pH value, it is of course always desirable to run it at the optimum for the particular enzyme product used to obtain maximum recovery in minimum time. Any pH variation therefrom would ordinarily be within about 0.2 from the optimum either way, and probably never over 0.5 to be feasible. It is apparent that the optimum conditions given are however not critical.

Thus, operable temperature ranges may run between about 75° F. and 105° F., or from 65° F. to 110° F., as above indicated. For a given enzyme having an established unit of emulsion-breaking strength with an optimum percentage for use of 0.20% based on the oil-content of the emulsion, by weight, a permissible range might be from 0.15% to 0.30%, which is between about a 25% reduction and a 50% increase, or such percentage might have a range from about 0.1% to about 1.0%. Similar percentage reductions and increases would apply to other particular enzyme systems where the optimum percentages are other than 0.20%. As enzyme strengths vary, optimum enzyme percentages by weight of the oil content of the emulsion will vary accordingly.

Operable pH ranges may vary practically about 0.2 either way, such as from pH 3.0 to pH 3.4 where the optimum is pH 3.2, or possibly on some occasions as much as 0.5 either way, or from 2.7 to 3.7. However, different usable enzymes may have different optimum pH values such as pH 4.5 or pH 3.5, with possible variations such as above indicated.

Sometimes other usable enzyme systems produce optimum effects at somewhat higher pH values, such as 3.6 or 4.0 or 4.5. These are always readily determinable by brief laboratory tests, as is true when standardizing any chemical or solution batch before use where optimum conditions or maximum results are sought. If pH 4 is needed, for example, a pH 3.2 emulsion is neutralized as with sodium citrate or with sodium hydroxide, or the like.

The following examples of the procedures of this process represent a preferred method of practicing the invention, and also acceptable modifications.

Example 1

One thousand pounds (1000 lbs.) of a 65% lemon oil emulsion (containing 650 lbs. of oil) from a centrifugal sludger 10 working on a dilute 0.3% emulsion slurry from a supply tank 12, initially furnished by a screw press 14 handling lemon peel, as previously described, was diluted in a stainless steel treating vessel 15 with 625 pounds of water to reduce the oil content of the 65% emulsion to 40% to yield a standard dispersion as previously explained. There was introduced into the 40% emulsion an emulsion-breaking enzyme of fungal origin, being derived from the molds, and which is in the pectase group and hence is from the esterase family. The enzyme of this example is known as a Pectinol which is one of several enzyme preparations derived from the same mold which is associated with the name Pectinol. These Pectinol enzymes are produced in different strengths or grades and forms. Some are liquid and some are dry, with or without an inert filler such as a sugar or diatomaceous earth. The particular Pectinol enzyme for this example is Pectinol 10M which is a dry culture product without filler and obtained from the indicated Pectinol mold source organism, as described below. The base strength unit here considered at unity is represented by factor 3.87 of the manufacturer. Should the unit factor vary from 3.87, the amount of enzyme is recalculated accordingly. Where the Pectinol 10M enzyme has the unit factor 3.87 as here, the optimum amount of enzyme used is 0.20% by weight based on the oil content of the emulsion. The unit factor is properly used even though pectin hydrolysis apparently is not involved.

For the purpose of this Example 1, 1.30 pounds of the described Pectinol 10M enzyme was introduced into the 40% oil emulsion containing 650 pounds of lemon oil. These operations were carried on at room temperatures around 75° F. and varying between about 70° F. and 80° F. The vessel 15 is equipped with a mechanical agitator 16, and this was put into operation to agitate the entire batch slowly but thoroughly, as well understood in the chemical arts. At the same time, heat was applied to the match, by steam coils 18, to raise the temperature to about 90° F. in a few minutes time. The steam supply was then adjusted to maintain the temperature close to 90° F., and slow agitation was continued until the emulsion had completely broken. In this typical instance, the time was 12 hours.

This de-emulsified batch of about 1625 pounds was then run to three centrifuges, represented by the centrifuge 20 of the flow sheet, and a recovery of 99.5% of the oil (646.75 pounds) was obtained in a four-hour centrifuge run. Typically in runs of prior conventional procedure, such an emulsion liberated only about 70% of the oil.

*Example 2*

As another example of an acceptable procedure 1000 pounds of 65% oil emulsion from lemon peel was diluted with water as before to yield a 40% emulsion, and to this was added another emulsion-breaking enzyme. This enzyme material likewise is obtained by culturing a mold to yield an enzyme system or pectase known as Cellulase 35, the mold being similarly identified. Here the strength factor is lower, being factor 1.55, which however relates to its cellulose activity, and about the same percentage based on the oil content of the emulsion is required as with Pectinol 10M. This enzyme material has an optimum pH value of pH 4.5. This requires neutralization of the emulsion to bring up the pH value, which is done with sodium citrate or sodium hydroxide or the like. While the enzyme is thus operable, it is less desirable than the Pectinol enzyme because of the neutralization requirement. This emulsion adjusted to pH 4.5 and containing the described Cellulase 35 enzyme was heated to 90° F. as before and maintained at that temperature with slow agitation for twelve hours until the emulsion broke. It was then centrifuged as in Example 1, and the oil recovery was 99.5%.

*Example 3*

The procedure of Example 1 was followed, with the differences that the temperature was carried at 85° F. and percentage of enzyme was reduced to 0.18%. The time for the emulsion to break was 18 hours and the yield of oil was 97% of the oil content of the emulsion.

*Example 4*

Here the temperature of Example 1 was raised to 100° F. The breaking time was 10 hours and the recovery was 99.5%.

*Example 5*

The procedure of Example 1 was followed, except that the percentage of enzyme used was raised to 0.25% based on the oil weight. The emulsion-breaking time was 10 hours and the oil recovery was 99.5% of the oil in the emulsion treated.

*Example 6*

The procedure of Example 1 was followed with the difference that the temperature was dropped to 85° F. for the run. The emulsion-breaking time was 16 hours and the recovery was 99.5% of the oil of the emulsion treated.

*Example 7*

In this run, the procedure of Example 2 was followed with the exception that the temperature was raised to 95° F. and the percentage of enzyme was increased to 0.25%. The emulsion-breaking time was 10 hours and the oil recovery was 99.5% of the oil in the emulsion treated.

*Example 8*

In this instance the procedure of Example 2 was used, except that the pH value was dropped to pH 4.0. The emulsion-breaking time was 18 hours, and the recovery was 95% of the oil of the emulsion.

Other runs have involved the treatment of navel orange and grapefruit peel treated similarly to some of the above. The increases in recovery of the respective oils over the recoveries by conventional procedures have been comparable to the above, percentagewise.

Respecting the various enzyme systems usable in practicing this invention, they are all pectases (also called pectinases and pectinesterases) derived from molds and having the properties of breaking these citrus oil emulsions. Such enzyme systems are prepared by culturing the respective mold organisms in well known and conventional manners. For example, Pectinol mold is cultured to yield the indicated Pectinols, especially the pectase Pectinol which is preferred for the present purpose, that is the pectase Pectinol 10M. As previously mentioned, other Pectinols are usable, such as that identified as Pectinol 59L. The mentioned Cellulase 35 also has emulsion-breaking properties for the present purpose. Thus, Cellulase 35 and pectase Pectinol 10M and 59L constitute appropriate emulsion-breaking esterases or, more specifically, pectases for this process. Another usable enzyme system of this group is pectase Anthocyanase, identified as Anthocyanase B. All of these pectases are classified as such because they hydrolyze pectin. Since pectin may not be involved in the present emulsion-breaking phenomenon, and since some pectases are much more effective than others, the presently usable pectases are here designated as emulsion-breaking pectases or emulsases.

The described pectic enzymes, which heretofore have commonly been used for pectin conversion, are obtained by growing the respective selected mold organisms on any of the conventional or preferred nutrient or culture media to which a further nutrient in the form of pectin has been added. The culture having grown for the required number of hours (such as 70 to 80 hours) to reach maturity, the whole mass is ground, and the case of the preferred form dried under vacuum to provide the desired enzyme product, which is then tested to determine its strength factor for the market. Or, as in one usable form, it may be put up as a liquid. Where grown on solids, such as cereals, the entire mass may again be ground and dried, or the liquid constituents may be separated with solvents, and then recovered in dry or liquid form, such as the dry Pectinol 10M and the liquid Pectinol 59L above mentioned.

With any particular enzyme, its emulsion-breaking activity depends, as has been indicated above, upon the hydrogen ion concentration (pH), the temperature at which the emulsion mixture is treated, the amount of the enzyme preparation used, and the treatment time. A considerable number of enzyme preparations are available on the market which have been derived from suitable strains of the required mold fungi. Such fungi include the Aspergillus, Penicillium and Rhizopus groups represented by the following individuals: *Aspergillus oryzae, Aspergillus flavus, Aspergillus niger, Aspergillus fumigatus, Aspergillus parasitans, Aspergillus tamari, Aspergillus wentii, Penicillium glaucum, Rhizopus tritici, Rhizopus nigricans,* and the like. Enzyme systems for the presently required pectic enzyme preparations are grown from such molds on cereals, as representative of polysaccharides, or more soluble nutrients including gelatin, to all of which pectin needs to be added.

As a general example of culturing, strains of the above molds may be grown on moist wheat bran and middlings, to which may be added various mineral nutrients as well understood in this art, and to which for the present purpose pectin is also added as a supplemental nutrient. The required pectic ferments are yielded in a few days at ordinary culturing temperatures. The culture is then ground and dried, or extracted with a solvent and the extract evaporated to dryness or employed as a liquid product, as preferred and as indicated above.

We claim:

1. A process of recovering citrus oil from citrus peel including: obtaining a water emulsion of citrus oil from citrus peel; subjecting such emulsion to the action of a pectase for a period of time to break the emulsion; and separating the liberated oil from the aqueous phase.

2. A process of breaking a citrus oil emulsion, including: subjecting a water emulsion of citrus oil to the action of a pectase to break the emulsion and liberate the oil content.

3. In a process for recovering citurus oil from an aqueous emulsion of citrus peel oil, the steps of: combining an aqueous emulsion of citrus peel oil with an amount of an emulsion-breaking pectic enzyme between 0.1% and 1.0% of the oil content of the emulsion; agitating said emulsion containing said enzyme at temperatures between about 65° F. and 110° F. for a period required to break the emulsion and liberate its oil content; and removing the liberated oil from the aqueous phase.

4. A process as in claim 3 wherein the temperatures of treatment lie in a range between about 80° F. and 100° F.

5. A process as in claim 3 wherein the enzyme is pectase Pectinol and the water to oil ratio is about 1:1.

6. A process as in claim 5 wherein the pH value of the emulsion undergoing treatment approximates pH 3.2, and the enzyme amount is between about 0.15% and 0.3%.

7. A process as in claim 6 wherein the treating temperature lies between about 80° F. and about 100° F.

8. A method for recovering citrus oil from citrus peel, including: treating citrus peel to obtain the oil thereof as an aqueous emulsion; concentrating the emulsion to raise the oil content; subjecting such emulsion to the action of an emulsion-breaking pectase derived from a mold and in emulsion-breaking proportion; establishing a temperature of such pectase-containing emulsion in a range between normal and the inactivating temperature of the pectase for a time for the pectase to act upon the emulsion to break the emulsion and liberate its oil content; and separating the liberated oil from the aqueous phase.

9. A method as in claim 8 wherein the water to oil concentration of the emulsion approximates 1:1 and the concentration of the pectase is less than 1% based on the oil content of the emulsion being treated.

10. A method as in claim 9 wherein the pectase is pectase Pectinol, the pH value of the emulsion being treated approximates pH 3.2, and the pectase is used in amount between about 0.18% and 0.22%.

11. A method as in claim 9 wherein the pectase is Pectinol 10M and is present in amount approximating 0.20% at factor 3.87, the emulsion has a water content of about 60%, and the pH value of the emulsion is about pH 3.2.

12. In a process for recovering citrus oil from emulsions thereof from citrus peel, the steps of: obtaining a water emulsion of citrus oil from citrus peel with a water to oil ratio approximating half oil and half water; commingling with such emulsion an emulsion-breaking amount, less than 1% based on the oil content of the emulsion, of an emulsion-breaking pectic enzyme preparation acting to break the citrus oil emulsion; effecting action of such enzyme preparation upon the emulsion at a temperature below the inactivating temperature of the enzymes, and for a time to break the emulsion and liberate its oil; and recovering the liberated oil.

13. A process as in claim 12 wherein the temperature of treatment is between about 70° F. and 105° F.

14. A process as in claim 12 wherein the enzyme preparation is pectase Pectinol.

15. A process as in claim 12 wherein the enzyme preparation is Pectinol 10M.

16. A process as in claim 12 wherein the enzyme preparation is from a mold selected from the class consisting of the Aspergillus, Penicillium and Rhizopus groups.

17. A process as in claim 16 wherein the mold is *Aspergillus oryzae*.

18. A process as in claim 16 wherein the mold is *Aspergilllus flavus*.

19. A process as in claim 16 wherein the mold is *Penicillium glaucum*.

20. A process as in claim 16 wherein the mold is *Rhizopus tritici*.

21. A method for recovering citrus oil from citrus peel including: treating the citrus peel to obtain the oil thereof as a dilute aqueous emulsion; concentrating the dilute emulsion to raise the oil content to at least about one-half oil; diluting the concentrated emulsion with water to an oil content of about 40%; commingling with the resultant 40% oil emulsion a quantity of pectase Pectinol 10M of factor 3.87 in amount approximating 0.20% of the oil content of the emulsion; raising the temperature of the emulsion to between about 80° F. and 100° F.; agitating such emulsion while maintaining the temperature between about 80° F. and 100° F. for a period of time between about six and about twenty hours at a pH value of about pH 3.2 until the emulsion breaks and the oil separates; and recovering the separated oil from the aqueous phase.

References Cited in the file of this patent

UNITED STATES PATENTS

| 1,751,331 | Hocker | Mar. 18, 1930 |
| 1,991,242 | Cole et al. | Feb. 12, 1935 |
| 1,999,443 | Cox | Apr. 30, 1935 |
| 2,101,371 | Lava | Dec. 7, 1937 |
| 2,280,046 | Musher | Apr. 14, 1942 |
| 2,510,138 | Pulley et al. | June 6, 1950 |
| 2,534,341 | Cross | Dec. 19, 1950 |
| 2,614,048 | Wenzelberger | Oct. 14, 1952 |
| 2,736,655 | Gordon et al. | Feb. 28, 1956 |
| 2,776,278 | Birds | Jan. 1, 1957 |

FOREIGN PATENTS

| 154,517 | Great Britain | Dec. 2, 1920 |
| 747,187 | Great Britain | Mar. 28, 1956 |